(12) United States Patent
Yacovone

(10) Patent No.: US 9,452,598 B2
(45) Date of Patent: *Sep. 27, 2016

(54) LOW DISTORTION INTERLAYER

(71) Applicant: SOLUTIA INC., St. Louis, MO (US)

(72) Inventor: Vincent James Yacovone, Springfield, MA (US)

(73) Assignee: Solutia Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/753,110

(22) Filed: Jun. 29, 2015

(65) Prior Publication Data

US 2015/0298447 A1    Oct. 22, 2015

Related U.S. Application Data

(60) Division of application No. 13/913,841, filed on Jun. 10, 2013, now Pat. No. 9,096,037, which is a continuation of application No. 11/061,778, filed on Feb. 22, 2005, now Pat. No. 8,551,600.

(51) Int. Cl.
| | |
|---|---|
| *B32B 17/10* | (2006.01) |
| *B29C 59/04* | (2006.01) |
| *B32B 37/24* | (2006.01) |
| *B29D 7/01* | (2006.01) |

(Continued)

(52) U.S. Cl.
CPC ............. *B32B 37/24* (2013.01); *B29C 59/04* (2013.01); *B29D 7/01* (2013.01); *B32B 17/10* (2013.01); *B32B 17/10036* (2013.01); *B32B 17/10339* (2013.01); *B32B 17/10449* (2013.01); *B32B 17/10577* (2013.01); *B32B 17/10587* (2013.01); *B32B 17/10761* (2013.01); *B32B 17/10889* (2013.01); *B32B 17/10935* (2013.01); *B32B 37/182* (2013.01); *B29C 59/005* (2013.01); *B29K 2029/00* (2013.01); *B29L 2007/002* (2013.01); *B32B 2307/42* (2013.01); *B32B 2457/20* (2013.01); *B32B 2551/00* (2013.01); *Y10T 156/10* (2015.01); *Y10T 156/1039* (2015.01); *Y10T 428/24355* (2015.01)

(58) Field of Classification Search
USPC ..................... 428/141; 156/60, 219; 264/293
See application file for complete search history.

(56) References Cited

U.S. PATENT DOCUMENTS

| | | | |
|---|---|---|---|
| 2,282,026 A | 5/1942 | Verons et al. | |
| 2,282,057 A | 5/1942 | Hopkins | |

(Continued)

FOREIGN PATENT DOCUMENTS

| | | |
|---|---|---|
| EP | 0 185 863 | 7/1986 |
| EP | 0 157 030 B1 | 7/1989 |

(Continued)

OTHER PUBLICATIONS

Wade, Bruce; "Vinyl Acetal Polymers"; Encyclopedia of Polymer Science and Technology; 2003; pp. 381-399; vol. 8.

(Continued)

*Primary Examiner* — Tahseen N Khan

(57) ABSTRACT

The present invention is in the field of multiple layer glass panels comprising a polymer sheet having desirable surface properties, and more specifically, the present invention is in the field of multiple layer glass panels comprising poly(vinyl butyral) having a finished surface of relatively low waviness and high roughness disposed in contact with poly(ethylene terephthalate) and/or other poly(vinyl butyral) type layers.

21 Claims, 1 Drawing Sheet

(51) Int. Cl.
*B32B 37/18* (2006.01)
*B29C 59/00* (2006.01)
*B29K 29/00* (2006.01)
*B29L 7/00* (2006.01)

(56) References Cited

U.S. PATENT DOCUMENTS

| | | |
|---|---|---|
| 3,841,890 A | 10/1974 | Coaker et al. |
| 4,017,661 A | 4/1977 | Gillery |
| 4,144,217 A | 3/1979 | Snelgrove et al. |
| 4,452,840 A | 6/1984 | Sato et al. |
| 4,465,736 A | 8/1984 | Nishihara et al. |
| 4,654,179 A | 3/1987 | Cartier et al. |
| 4,671,913 A | 6/1987 | Gen et al. |
| 4,786,783 A | 11/1988 | Woodard |
| 4,799,745 A | 1/1989 | Meyer et al. |
| 4,814,529 A | 3/1989 | Cartier et al. |
| 4,874,814 A | 10/1989 | Cartier et al. |
| 4,902,464 A | 2/1990 | Cartier et al. |
| 4,973,511 A | 11/1990 | Farmer et al. |
| 5,013,779 A | 5/1991 | Fariss et al. |
| 5,091,258 A * | 2/1992 | Moran .............. B32B 17/10 428/141 |
| 5,137,954 A | 8/1992 | DasGupta et al. |
| 5,425,977 A | 6/1995 | Hopfe |
| 5,455,103 A | 10/1995 | Hoagland et al. |
| 5,595,818 A | 1/1997 | Hopfe et al. |
| 5,728,472 A | 3/1998 | D'Errico |
| 6,093,471 A * | 7/2000 | Hopfe .............. B32B 17/10577 428/141 |
| 6,825,255 B2 | 11/2004 | Yuan et al. |
| 2013/0074931 A1 | 3/2013 | Chen et al. |

FOREIGN PATENT DOCUMENTS

| | | |
|---|---|---|
| EP | 0 525 403 A1 | 2/1993 |
| EP | 0 710 545 A1 | 5/1996 |
| EP | 1 233 007 B1 | 6/2008 |
| JP | 59223256 | 12/1984 |
| WO | WO 88/01230 A1 | 2/1988 |
| WO | WO 2006/091707 A1 | 8/2006 |

OTHER PUBLICATIONS

International Search Report and Written Opinion for International Application No. PCT/US2006/006357; date mailed Jun. 23, 2006.
International Preliminary Report on Patentability for International Application No. PCT/US2006/006357; date mailed Aug. 28, 2007.
Notice of opposition against European Publication No. 1 874 535 filed by Kuraray Europe GmbH; date mailed Sep. 4, 2009.
Communication of Notices of Oppositions (R 79(1) EPC) for European Publication No. 1 874 535; date mailed May 18, 2009.
Observations filed in Response to Opposition for European Publication No. 1 874 535; date mailed Jul. 28, 2009.
Enquiry for Russian Application No. 1007134242/04; date mailed Dec. 24, 2009.
Office Action for Ukrainian Application No. a 2007 10234; date mailed Jul. 14, 2009.
Response to Office Action for Ukrainian Application No. a 2007 10234; date mailed Jan. 22, 2010.
Examination Report for New Zealand Application No. 561552; date mailed Jul. 3, 2009.
USPTO Notice of Allowance dated Jun. 12, 2015 for copending U.S. Appl. No. 13/913,841.
USPTO Notice of Allowance dated Jun. 12, 2015 for copending U.S. Appl. No. 14/016,821.

* cited by examiner

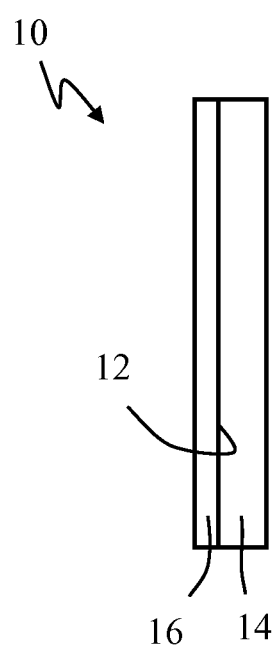

LOW DISTORTION INTERLAYER

CROSS-REFERENCE TO RELATED APPLICATION

This application is a divisional of U.S. patent application Ser. No. 13/913,841, filed on Jun. 10, 2013 which is a continuation of U.S. patent application Ser. No. 11/061,778, filed on Feb. 22, 2005, now U.S. Pat. No. 8,551,600, the disclosure of which is incorporated herein by reference in its entirety.

FIELD OF THE INVENTION

The present invention is in the field of multiple layer glass panels comprising a polymer sheet having desirable surface properties, and more specifically, the present invention is in the field of multiple layer glass panels comprising poly(vinyl butyral) having a finished surface of relatively low waviness and high roughness disposed in contact with poly(ethylene terephthalate) and/or other poly(vinyl butyral) type layers.

BACKGROUND

Angstrom-thick or thicker layers of metals, metal compounds, and other agents have conventionally been used in multiple layer glass panels to reflect heat-producing infrared solar radiation while transmitting visible light. These layers can be arranged in sequence as stacks, and can be disposed on any appropriate substrate, such as biaxially stretched, thermoplastic poly(ethylene terephthalate) (PET) film or similar material. One form, known as an interference filter, comprises at least one layer of reflective metal sandwiched between reflection-suppressing or anti-reflective dielectric layers.

When a metallized film such as an interference filter is combined with glass in a multiple layer glass laminate, for example in a vehicle windshield, a shock-dissipating interlayer of plasticized poly(vinyl butyral) (PVB) is usually included to absorb a blow from the head of an occupant within the vehicle or from a foreign object from outside the vehicle without allowing penetration through the windshield. In a typical arrangement, a single layer of a poly(ethylene terephthalate)-type coated film is disposed between two layers of a poly(vinyl butyral)-type material to form a three layer structure that is subsequently disposed between two layers of glass. The finished multiple layer glass panel has the combined benefit of safety and radiation transmission control.

An optical quality defect that can be particularly noticeable at oblique viewing angles can occur in such safety glass panels as a visually apparent, isotropic, wave-like reflected image estimated to have an amplitude of about 0.002 to 0.012 mm and a wavelength of 2.5-7.5 mm. It is referred to hereinafter by the term "applesauce." Applesauce is believed to occur because the polyethylene-type layer, which reflects light at oblique viewing angles, conforms to the poly(vinyl butyral)-type layer during lamination and will assume any non-linearity, or waviness, that is present on that poly(vinyl butyral)-type layer. Other objectionable visual defects, such as "mottle" (mottled color appearance), can also occur in colored poly(vinyl butyral) glass laminates when poly(vinyl butyral)-type layers are disposed in contact with each other. For example, when pigmented poly(vinyl butyral) is coextruded with non-pigmented poly(vinyl butyral) and the resulting layer is then laminated with other layers or glass, mottle can result.

Several attempts to mitigate the severity of applesauce and mottle have been reported (see, for example, U.S. Pat. Nos. 4,465,736, 4,973,511, and 5,091,258), however, further methods of reducing applesauce and mottle are needed. Accordingly, further improved compositions and methods are needed to enhance the characteristics of polymer and poly(vinyl butyral) sheets that are used in conjunction with a polymer film layer, and specifically poly(ethylene terephthalate), without adversely affecting the optical characteristics of the resulting multiple layer structure.

SUMMARY OF THE INVENTION

Now, according to the present invention, polymer sheets have been developed that have low waviness and high roughness values prior to lamination, allowing the production of low distortion multiple layer laminated glass panels incorporating poly(ethylene terephthalate) type layers or low distortion multiple layer laminated glass panels incorporating adjacent layers of a poly(vinyl butyral) type material.

The present invention includes a polymer sheet, comprising: poly(vinyl butyral); and, a plasticizer, wherein said polymer sheet has a surface with a waviness index of less than 20,000 square micrometers, an $R_z$ value of at least 20 micrometers, and a permanence of between 10 and 95.

The present invention includes a method of producing a multiple layer interlayer, comprising the steps of: forming a first polymer sheet comprising poly(vinyl butyral) and a plasticizer, wherein said first polymer sheet has a first surface and a second surface and wherein said first surface has a waviness index of less than 20,000 square micrometers, an $R_z$ value of at least 20 micrometers, and a permanence of between 10 and 95; disposing a layer of polymer film in contact with said first surface of said first polymer sheet to form a stack; and, laminating said stack.

The present invention includes a method of producing a polymer sheet, comprising: forming a layer comprising poly(vinyl butyral) and a plasticizer, wherein said layer has a first surface and a second surface and a waviness index of less than 20,000 square micrometers and an $R_z$ value of less than 20 micrometers on said first surface, and embossing said layer on said first surface with a roughness pattern to produce said polymer sheet, wherein said polymer sheet has a waviness index of less than 20,000 square micrometers, and an $R_z$ value of at least 20 micrometers on the side corresponding to said first surface of said layer.

The present invention includes a method of producing a multiple layer panel, comprising the steps of: forming a first polymer sheet comprising poly(vinyl butyral) and a plasticizer, wherein said first polymer sheet has a first surface and a second surface and wherein said first surface has a waviness index of less than 20,000 square micrometers, an $R_z$ value of at least 20 micrometers, and a permanence of between 10 and 95; disposing a layer of polymer film in contact with said first surface of said first polymer sheet to form a stack; disposing a layer of glass in contact with said polymer sheet opposite said polymer film; and, laminating said stack.

BRIEF DESCRIPTION OF THE FIGURE

FIG. 1 represents a schematic illustration of a laminated polymer sheet//polymer film construct.

DETAILED DESCRIPTION

According to the present invention, it has been discovered that the defect known as "applesauce," which can occur in multiple layer glass panels that incorporate a poly(vinyl butyral)-type sheet disposed in contact with a polymer film layer, such as poly(ethylene terephthalate), can be reduced by using a polymer sheet and/or the methods of the present invention. Further, mottle defects can be similarly reduced. Polymer sheets of the present invention have a low waviness index, or WI, which is a measure of the undulations of the surface of the sheet, and a high roughness value, or $R_z$, which is a measure of the smaller irregularities that occur, generally by intention, on the surface of the sheet.

As shown in FIG. 1 generally at 10, some embodiments of the present invention involve reduction of distortion that can occur as a result of the interface 12 between a polymer sheet 14 and a polymer film layer 16. As will be described in more detail below, the polymer sheet 14 can comprise any poly(vinyl butyral)-type material, and the polymer film layer 16 can comprise any poly(ethylene terephthalate)-type material. Typically, a multiple layer glass panel can comprise the polymer sheet 14 and polymer film layer 16 shown in FIG. 1 as well as a second polymer sheet layer (not shown), disposed in contact with the polymer film layer 16 opposite said polymer sheet 14. This three layer construct can then be disposed between two layers of glass to form a multiple layer glass panel.

Formation of a polymer sheet according to the present invention involves producing a polymer sheet that has a low waviness index and a high roughness value. The low waviness index of the polymer sheet 14 reduces the occurrence of applesauce and/or mottle in the finished glass panel by reducing the distortion at the interface 12 between the polymer sheet 14 and the polymer film layer 16, or between two layers of polymer sheet (not shown) while the high roughness value allows proper de-airing of the layers during lamination. In various embodiments of the present invention, one or both surfaces of a polymer sheet can have a low waviness index and high roughness value.

The present invention includes polymer sheets that have been produced by a method of the present invention. The present invention includes methods of producing a polymer sheet that comprise the steps of producing a polymer sheet having a surface that has a low waviness index and a low roughness value; and, embossing that surface of the polymer sheet with a roughness pattern to impart thereon a high roughness value.

Previous attempts to reduce or eliminate applesauce have, among other things, involved producing a plasticized poly(vinyl butyral) layer that had a low waviness index. Such attempts often produced layers lacking desirable qualities because the roughness value of the smooth layer produced was low, thereby creating difficulties with the lamination steps of the assembly process. Other attempts at reducing applesauce have involved a process in which a layer of polymer film, such as poly(ethylene terephthalate), is disposed between two layers of poly(vinyl butyral), rolled to form a three layer laminate, and then embossed on the exposed surfaces of the poly(vinyl butyral) layers (see Japanese Patent Application JP59223256). Lamination of smooth poly(vinyl butyral) with poly(ethylene terephthalate) can result in difficulties in the deairing step of the lamination process.

The present invention provides a method for producing a polymer sheet having a low waviness index and a high roughness value, thereby reducing or eliminating applesauce and other optical defects that can occur when a polymer film is used in combination with a polymer sheet such as poly(vinyl butyral), or defects that can occur when multiple layers of poly(vinyl butyral) are used.

In the first step of various embodiments of the present invention, a polymer sheet is produced that has, on one or both surfaces and not necessarily the same, a waviness index of less than 20,000 square micrometers, less than 15,000 square micrometers, less than 12,000 square micrometers, less than 10,000 square micrometers, less than 8,000 square micrometers, less than 6,000 square micrometers, or less than 5,000 square micrometers, and a roughness value of less than 15 micrometers, less than 12 micrometers, less than 10 micrometers, less than 9 micrometers, less than 8 micrometers, less than 7 micrometers, less than 6 micrometers, or less than 5 micrometers, and the values given above for waviness index and roughness value can be combined in any combination. In various specific embodiments of the present invention WI and $R_z$ are less than 20,000 square micrometers and less than 20 micrometers, less than 15,000 square micrometers and less than 10 micrometers, less than 15,000 square micrometers and less than 7 micrometers, or are less than 15,000 square micrometers and less than 5 micrometers. The values given in this paragraph are "pre-embossing" values for waviness and roughness.

In the next step of these embodiments, the relatively smooth surface or surfaces is/are embossed with a roughness pattern. This roughness pattern can be any suitable pattern, and, in various embodiments, results in a polymer sheet having a final roughness value (post-embossing value) of at least 20 micrometers, at least 25 micrometers, at least 30 micrometers, at least 35 micrometers, at least 45 micrometers, or at least 55 micrometers. Because this embossing step is carried out prior to lamination of the layer with poly(ethylene terephthalate), or glass, or another layer of poly(vinyl butyral), the embossed surfaces allow for superior deairing between the layers of the final product.

By using the methods of the present invention, it has been discovered that polymer sheets can be produced having one or both surfaces with an advantageously low waviness index and a relatively high roughness value. Specifically, in various embodiments of the present invention, a polymer sheet, after embossing with a roughness pattern, has a waviness index of less than 20,000 square micrometers, less than 15,000 square micrometers, less than 12,000 square micrometers, less than 10,000 square micrometers, less than 8,000 square micrometers, less than 6,000 square micrometers, or less than 5,000 square micrometers, and a roughness value of at least 20 micrometers, at least 25 micrometers, at least 30 micrometers, at least 35 micrometers, at least 45 micrometers, or at least 55 micrometers, and the values given above for waviness index and roughness value can be combined in any combination, where appropriate. The values given in this paragraph are the "post-embossing" values of waviness and roughness. For these and other embodiments of the present invention in which both a WI and a roughness value are given, corresponding further embodiments are also part of the present invention where only the roughness values given, and not the WI, are used to characterize the polymer sheet.

In addition to the WI and roughness values, polymer sheets of the present invention are also characterized by their permanence, which is a measure of the alterability of the fine surface topography of the sheet. Determination of permanence for one or both surfaces of polymer sheet can be determined according to the procedure described elsewhere herein.

Polymer sheets of the present invention that are produced with low roughness and waviness and are embossed to a high roughness value can have permanence values that range from 95 down to 10. This range contrasts with polymer sheets that rely solely on melt fracture to obtain surface roughness, which generally have permanence values at 100 or close to 100. The value of the permanence that is imparted to a polymer sheet will depend on the desired application and lamination processing conditions that may be employed. For applications in which it is desirable to maximally reduce applesauce, for example, polymer sheets of the present invention may have permanence values of less than 40, less than 30, or less than 20, which is not to say that applesauce is not reduced in other embodiments having higher permanence values. In other embodiments in which a specific reduction of other defects is desirable, permanence values of from 60 to 95, 65 to 90, or 70 to 80 can be imparted to the polymer sheet. Other permanence values that are useful in various embodiments of the present invention are 10 to 30, 30 to 50 and from 50 to 95, 50 to 90, or 50 to 85.

These permanence values given in this paragraph can be combined with the post embossing roughness and waviness values given above in any combination.

The permanence value of the polymer sheets of the present invention can be controlled by altering, for example, any of the following parameters: altering air pressure of a contact roller to press material into an embossing and/or calendaring roller(s), with higher pressure associated with higher permanence; raising polymer surface temperature through contact or non-contact methods, for example IR heaters, with increased temperature associated with higher permanence; and, varying line speeds to control heat take up rate of polymer, with lower line speeds associated with higher permanence.

By altering permanence, a polymer sheet of the present invention can be tailored to suit a particular manufacturing process. For example, a permanence of 25 to 40 can be used for a process using a nip roll pre press, and a permanence of 50 to 80 can be used for a process using a vacuum bag pre press.

The production of a polymer sheet that is sufficiently smooth to produce the pre-embossing values given above—that is, has sufficiently low waviness index and roughness value—can be achieved by altering conventional production of the polymer sheet according to the following:

For methods of production in which a die is used to produce the polymer sheet, an extremely smooth layer can be produced by increasing the die lip temperature of the die sufficiently to cause the production of sheets having the above-mentioned pre-embossing waviness index and roughness parameters. In various embodiments, the die lip temperature is maintained at from 170° C. to 230° C., 190° C. to 210° C., or 195° C. to 205° C.

For applications that use a die roll to produce polymer sheets, smoothness can be attained by using a mirror finish casting roll, for example, made of chrome, having no, or very little, surface roughness or waviness and/or using a high blade temperature. Other embodiments use a mirror finish casting roll to achieve the same effect. Generally, the waviness of the sheet produced will be similar to that of the surface of the die roll, so the waviness of the die roll should be kept to levels commensurate with the desired waviness of the finished sheet. Of course, one of ordinary skill in the art will recognize that the parameters of production that are used will depend on the polymer melt used and the machine that is being used to produce the polymer sheet, but that an acceptable smoothness according to the present invention can be readily achieved by altering production parameters as disclosed herein.

The second step, which is embossing a roughness pattern on the smooth polymer sheet, can be performed by any appropriate method, including, for example, by using rollers having a roughness pattern to impart the opposite ("negative image") pattern on one or both surfaces of the polymer sheet. The net effect of this step is to increase the roughness value to desirably higher values. One or more additional rollers can be used between the point of extrusion of the sheet and the various steps of the method, as needed to direct and form the sheets.

The present invention includes the following various embodiments:

In various embodiments, the present invention includes a polymer sheet, such as poly(vinyl butyral) having at least one surface with the post-embossing values for WI and $R_z$ given above. The present invention further includes a polymer sheet, such as poly(vinyl butyral) having two surfaces with the post-embossing values for WI and $R_z$ given above.

The present invention also includes a polymer sheet, such as poly(vinyl butyral), having one or two surfaces with the post-embossing values for WI and $R_z$ given above, wherein the layer is not in contact with any other layers, but rather is a single polymer sheet not disposed in any laminate.

In various embodiments, the present invention includes a multiple layer interlayer for use in laminated glass, wherein the interlayer comprises a polymer sheet, such as poly(vinyl butyral), that has a surface with the post-embossing values for WI and $R_z$ given above prior to laminating that surface to a polymer film, such as poly(ethylene terephthalate).

The present invention includes any polymer sheet or multiple layer interlayer having a polymer sheet and polymer film made by any of the processes of the present invention.

In various embodiments, the present invention includes a method of making a multiple layer glass panel, comprising stacking a polymer sheet of the present invention in a stack with one or more polymer films or polymer sheets, and forming an interlayer.

In various embodiments, the present invention includes a method of making a multiple layer glass assembly, comprising, stacking a polymer sheet of the present invention in a stack with one or more polymer films or polymer sheets, forming an interlayer, and then forming a multiple layer glass panel by laminating the interlayer between two layers of glass. These panels can be any type of laminated glass structure, including, without limitation, architectural glass and automobile windshields.

In various embodiments, the present invention includes a windshield or window comprising any of the polymer sheets or interlayers of the present invention.

In various embodiments, the present invention includes a method of making a multiple layer interlayer, comprising forming a polymer sheet, wherein both surfaces of the polymer sheet have the pre-embossing values given above, embossing the polymer sheet on one or two of the two surfaces, wherein embossing results in a surface having the post-embossing values given above, and laminating the polymer sheet to a polymer film, wherein the polymer film is disposed on an embossed surface of the polymer sheet.

Further embodiments include laminating the polymer film between two polymer sheets, wherein one or both of the surfaces of the polymer sheets in contact with the polymer film are produced according to the present invention. Further embodiments include laminating the three layer interlayer just described between two layers of glass. As a further example, some embodiments can have more than one polymer film, for example, a construct such as: polymer sheet// polymer film//polymer sheet//polymer film//polymer sheet.

In a further embodiment, a construct having the layout of glass//polymer sheet//polymer film can be formed by laminating the polymer sheet and polymer film first and then laminating the combination to the glass, or by laminating all three together at the same time. Any of the polymer sheets of the present invention can be used in this embodiment. In conventional applications in which this three layer assembly is used, the polymer film layer, which is typically poly(ethylene terephthalate), is typically thicker than the polymer films used in glass//sheet//film//sheet//glass embodiments. This extra thickness is generally required to offer a more rigid film that can resist deformation and consequent optical defects that tend to occur when a second rigid pane of glass is not used to support the polymer layers. In embodiments of the present invention having a glass layer, a polymer sheet of the present invention, and a polymer film, the resulting three layer unit can use a relatively thinner polymer film because the superior qualities of the polymer sheets of the present invention afford improved reduction of optical defects.

The present invention can further be used to reduce the defect known as gradient mottle. Gradient mottle is a defect observed in windshields made with gradient poly(vinyl butyral) and similar polymers where a dark colored poly(vinyl butyral) is coextruded within a clear poly(vinyl butyral) layer. The gradient (shaded) part of the windshield can exhibit non-uniform dark and light areas. In some products a windshield also contains a poly(ethylene terephthalate) film for solar protection. In this case, gradient mottle and applesauce can appear simultaneously.

In applications in which pigments, dyes, or other agents are used to create a darkened region within a windshield, for example, production of the polymer sheet using the methods of the present invention will result, in various embodiments, in a product with the above-given pre- and post-embossing values. Subsequent lamination of the polymer sheet having the gradient in a glass assembly, with or without other layers, will result in a reduction of gradient mottle. Accordingly the present invention includes embodiments in which a polymer sheet with a color gradient is produced according to the methods of the present invention, as well as multiple layer glass panels incorporating polymer sheets thus produced.

Further embodiments ameliorate LAG mottle, which can appear in architectural colored laminates made with layers of clear and pigmented poly(vinyl butyral) in contact with each other. LAG mottle has an appearance that is similar to gradient mottle. Various embodiments of the present invention involve architectural multiple layer glass panels having multiple polymer sheet layers. These embodiments of the present invention include methods for making a multiple polymer sheet construct in which two or more polymer sheets, at least one of which is produced by the methods of the present invention, are stacked in contact with one another, and optionally a polymer film layer such as poly(ethylene terephthalate) and glass layers, and then laminated into a finished product. These embodiments comprise two poly(vinyl butyral)-type polymer sheets that are laminated in contact with one another, and one or both of the polymer sheets can have one or both surfaces with the pre and post-embossing values given elsewhere herein, and one or both of the polymer sheets can comprise a dye. In other embodiments, a polymer sheet of the present invention is disposed in contact with another polymer sheet, and neither polymer sheet comprises a pigment or dye.

Polymer Film

The polymer film layer 16 shown in FIG. 1 can be any suitable thermoplastic film that is conventionally used as a performance enhancing layer in multiple layer glass panels. In various embodiments, the polymer film layer 16 has a thickness of 0.013 mm to 0.20 mm, preferably 0.025 mm to 0.1 mm, or 0.04 to 0.06 mm. The polymer film layer 16 can optionally be surface treated or coated to improve one or more properties, such as adhesion or infrared radiation reflection. These functional performance layers include, for example, a multi-layer stack for reflecting infra-red solar radiation and transmitting visible light when exposed to sunlight. This multi-layer stack is known in the art (see, for example, WO 88/01230 and U.S. Pat. No. 4,799,745) and can comprise, for example, one or more Angstroms-thick metal layers and one or more (for example two) sequentially deposited, optically cooperating dielectric layers. As is also known, (see, for example, U.S. Pat. Nos. 4,017,661 and 4,786,783), the metal layer(s) may optionally be electrically resistance heated for defrosting or defogging of any associated glass layers.

The polymer film layer 16, in some embodiments, is optically transparent (i.e. objects adjacent one side of the layer can be comfortably seen by the eye of a particular observer looking through the layer from the other side), and usually has a greater, in some embodiments significantly greater, tensile modulus regardless of composition than that of the adjacent polymer sheet 14. In various embodiments, the polymer film layer 16 comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers and the like. In various embodiments, the polymer film layer 16 comprises materials such as re-stretched thermoplastic films having the noted properties, which include polyesters, for example poly(ethylene terephthalate) and poly(ethylene terephthalate) glycol (PETG). In various embodiments, poly(ethylene terephthalate) is used, and, in various embodiments, the poly(ethylene terephthalate) has been biaxially stretched to improve strength, and has been heat stabilized to provide low shrinkage characteristics when subjected to elevated temperatures (e.g. less than 2% shrinkage in both directions after 30 minutes at 150° C.).

Various coating and surface treatment techniques for poly(ethylene terephthalate) film that can be used with the present invention are disclosed in published European Application No. 0157030.

Polymer Sheet

The following section describes the various materials that can be used to form polymer sheets of the present invention as shown as element 14 in FIG. 1 that have properties useful as an interlayer in safety glass, such as poly(vinyl butyral).

As used herein, a "polymer sheet" means any polymer composition formed by any suitable method into a thin layer that is suitable for use as an interlayer in laminated glass structures. As used herein, "resin" refers to the polymeric (for example poly(vinyl butyral)) component that is removed from the mixture that results from the acid catalysis and subsequent neutralization of the polymeric precursors. Resin will generally have other components in addition to the polymer, for example poly(vinyl butyral), such as acetates, salts, and alcohols. As used herein, "melt" refers to a melted mixture of resin with a plasticizer and optionally other additives.

Polymer sheets made by the processes disclosed herein are part of the present invention and are included within the scope of the invention.

The polymer sheets of the present invention can comprise any suitable polymer, and, in a preferred embodiment, as exemplified above, the polymer sheet comprises poly(vinyl butyral). In any of the embodiments of the present invention given herein that comprise poly(vinyl butyral) as the polymeric component of the polymer sheet, another embodiment is included in which the polymer component consists of or consists essentially of poly(vinyl butyral). In these embodiments, any of the variations in additives, including plasticizers, disclosed herein can be used with the polymer sheet having a polymer consisting of or consisting essentially of poly(vinyl butyral).

In one embodiment, the polymer sheet comprises a polymer based on partially acetalized poly(vinyl alcohol)s. In another embodiment, the polymer sheet comprises a polymer selected from the group consisting of poly(vinyl butyral), polyurethane, polyvinyl chloride, poly(ethylene vinyl acetate), combinations thereof, and the like. In one embodiment, the polymer sheet comprises poly(vinyl butyral). In other embodiments, the polymer sheet comprises plasticized poly(vinyl butyral). In further embodiments the polymer sheet comprises poly(vinyl butyral) and one or more other polymers. Other polymers having a suitable glass transition temperature can also be used. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful as components in polymer sheets.

For embodiments comprising poly(vinyl butyral), the poly(vinyl butyral) can be produced by known acetalization processes that involve reacting poly(vinyl alcohol) (PVOH) with butyraldehyde in the presence of an acid catalyst, followed by neutralization of the catalyst, separation, stabilization, and drying of the resin.

In various embodiments, the polymer sheet comprising poly(vinyl butyral) comprises 10 to 35 weight percent (wt. %) hydroxyl groups calculated as poly(vinyl alcohol), 13 to 30 wt. % hydroxyl groups calculated as poly(vinyl alcohol), or 15 to 22 wt. % hydroxyl groups calculated as poly(vinyl alcohol). The polymer sheet can also comprise less than 15 wt. % residual ester groups, 13 wt. %, 11 wt. %, 9 wt. %, 7 wt. %, 5 wt. %, or less than 3 wt. % residual ester groups calculated as polyvinyl acetate, with the balance being an acetal, preferably butyraldehyde acetal, but optionally including other acetal groups in a minor amount, e.g., a 2-ethyl hexanal group (see, for example, U.S. Pat. No. 5,137,954).

In various embodiments, the polymer sheet comprises poly(vinyl butyral) having a molecular weight at least 30,000, 40,000, 50,000, 55,000, 60,000, 65,000, 70,000, 120,000, 250,000, or at least 350,000 grams per mole (g/mole or Daltons). Small quantities of a dialdehyde or trialdehyde can also be added during the acetalization step to increase molecular weight to at least 350 g/m (see, for example, U.S. Pat. Nos. 4,902,464; 4,874,814; 4,814,529; 4,654,179) As used herein, the term "molecular weight" means the weight average molecular weight. Any suitable method can be used to produce the polymer sheets of the present invention. Details of suitable processes for making poly(vinyl butyral) are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, 3$^{rd}$ edition, Volume 8, pages 381-399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.

Various adhesion control agents can be used in polymer sheets of the present invention, including sodium acetate, potassium acetate, and magnesium salts. Magnesium salts that can be used with these embodiments of the present invention include, but are not limited to, those disclosed in U.S. Pat. No. 5,728,472, such as magnesium salicylate, magnesium nicotinate, magnesium di-(2-aminobenzoate), magnesium di-(3-hydroxy-2-napthoate), and magnesium bis (2-ethyl butyrate)(chemical abstracts number 79992-76-0). In various embodiments of the present invention the magnesium salt is magnesium bis(2-ethyl butyrate).

Additives may be incorporated into the polymer sheet to enhance its performance in a final product. Such additives include, but are not limited to, plasticizers, dyes, pigments, stabilizers (e.g., ultraviolet stabilizers), antioxidants, anti-block agents, flame retardants, IR adsorbers, combinations of the foregoing additives, and the like, as are known in the art.

In various embodiments of polymer sheets of the present invention, the polymer sheets can comprise 20 to 60, 25 to 60, 20 to 80, or 10 to 70 parts plasticizer per one hundred parts of resin (phr). Of course other quantities can be used as is appropriate for the particular application. In some embodiments, the plasticizer has a hydrocarbon segment of fewer than 20, fewer than 15, fewer than 12, or fewer than 10 carbon atoms.

The amount of plasticizer can be adjusted to affect the glass transition temperature ($T_g$) of the poly(vinyl butyral) sheet. In general, higher amounts of plasticizer are added to decrease the $T_g$. Poly(vinyl butyral) polymer sheets of the present invention can have a $T_g$ of 40° C. or less, 35° C. or less, 30° C. or less, 25° C. or less, 20° C. or less, and 15° C. or less.

Any suitable plasticizers can be added to the polymer resins of the present invention in order to form the polymer sheets. Plasticizers used in the polymer sheets of the present invention can include esters of a polybasic acid or a polyhydric alcohol, among others. Suitable plasticizers include, for example, triethylene glycol di-(2-ethylbutyrate), triethylene glycol bis(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779. and $C_6$ to $C_8$ adipate esters, such as hexyl adipate. In some embodiments, the plasticizer is triethylene glycol bis(2-ethylhexanoate).

The poly(vinyl butyral) polymer and plasticizer additives can be thermally processed and configured into sheet form according to methods known to those of ordinary skill in the art, with the modifications to the process described above in order to produce a polymer sheet having the desired waviness index and roughness value prior to embossing. One exemplary method of forming a poly(vinyl butyral) sheet comprises extruding molten poly(vinyl butyral) comprising resin, plasticizer, and additives (hereinafter "melt") by forcing the melt through a die (for example, a die having an opening that is substantially greater in one dimension than in a perpendicular dimension). Another exemplary method of forming a poly(vinyl butyral) sheet comprises casting a melt from a die onto a roller, solidifying the resin, and subsequently removing the solidified resin as a sheet. In various embodiments, the polymer sheets can have thicknesses of 0.1 to 2.5 millimeters, 0.2 to 2.0 millimeters, 0.25 to 1.75 millimeters, and 0.3 to 1.5 millimeters (mm).

Also included in the present invention are stacks or rolls of any of the polymer composition sheets of the present invention disclosed herein in any combination.

Further, the present invention includes a laminated safety glass comprising a layer of glass, typically comprising silicon dioxide, disposed in contact with any of the polymer sheet//polymer film embodiments of the present invention. Further included is a laminated safety glass comprising at two sheets of glass with any of the polymer sheet//polymer film constructs of the present invention disposed therebetween.

The present invention also includes windshields, windows, and other finished glass products comprising any of the multiple layer constructs of the present invention.

Various polymer sheet and/or laminated glass characteristics and measuring techniques will now be described for use with the present invention.

As used herein, "waviness index" or "WI" and "roughness value" or "$R_z$", can be determined according to the following:

To determine $R_z$, a 15 cm by 15 cm test sample of plasticized polymer sheet is placed on a vacuum plate regulated by fluid at room temperature circulating through it. A vacuum of 5 psi is imposed to draw the sample against the plate surface. A model S8P Perthometer with a PRK drive unit and an RFHTB-250 tracing stylus (available from Mahr Gage Co., New York) is used to directly measure sheet surface roughness of each side of the test sample. Profile selection is set to "R" on the instrument. The tracing stylus moves automatically across the sample surface. The length of each trace is 17.5 mm composed of 7 sequential measuring lengths $L_c$ of 2.5 mm. The measuring length is 12.5 mm and is composed of the 5 measuring length obtained by eliminating the first and the last sections. The average value of individual roughness depths in these five sequential measuring lengths $L_c$ is determined and $R_z$ is the average of ten such determinations, five taken in the machine direction of extrusion (MD) and five in the cross machine direction (CMD). The distance between two consecutive traces in each direction is 3 mm.

To determine a waviness index value (WI), the Perthometer referred to above is used with the profile selection set to "W". A tracing length of 56 mm and a measuring length of 40 mm are used for this measurement.

The 40 mm measuring length is composed of five 8 mm measuring lengths (the two end 8 mm measuring lengths are eliminated). Using a digital output from a plug connection in the back of the Perthometer, the variable waviness output voltage signal from the Perthometer is electronically fed to a computer. Ten traces are performed, with five traces taken in the machine direction of extrusion and five traces in the cross machine direction with a distance of 3 mm between two consecutive traces. The program Sub SmoothData( ), which is loaded on the computer and which is provided herein, computes a single WI value from the input of the ten traces.

The WI value of the surface of a sheet of polymer, for example from a sheet that is sized for use in a car windshield, is then computed by averaging 100 single WI values from evenly distributed sampling points throughout the surface of the sheet.

The same calculations can be performed on the opposite surface, and, as indicated elsewhere, can yield similar or different results, depending on the method of manufacture and the desired product. In various embodiments of the present invention, at least 90 of the 100 values obtained fall within +/−20% of the average of the 100 values, +/−15% of the average, +/−10% of the average, +/−5% of the average, or +/−2% of the average of the 100 values. Unless otherwise indicated in a claim, when a "WI value" for a polymer sheet surface is given in a claim, at least 90 of the 100 values obtained in the measurement process described above fall within +/−20% of the average of the 100 values.

Using the above-noted Perthometer, other set-up switch positions for roughness are as follows: Filter: GS, Profile: R, LC: N 2.5 mm, LT: 17.5 mm, VB: 625 micrometers. For waviness the set-ups are as follows Filter: GS, Profile: W, LC: N 8.0 mm, LT: 56 mm, VB: 625 micrometers.

Polymer sheets of the present invention are also characterized by their "permanence," which is determined according to the following technique: For polymer sheets that are embossed, a polymer sheet is measured for $R_z$ ($R_z$ Base) prior to embossing. After embossing, a second $R_z$ measurement is taken ($R_z$ Final). For polymer sheets that are not embossed a roughness measurement, $R_z$, is taken and designated $R_z$ Final, and $R_z$ Base is given the value zero. For both embossed and non-embossed sheets, a 12.7 centimeter square sample is then cut from the polymer sheet. A 14 centimeter square piece of poly(ethylene terephthalate) is placed on a wood frame resting on a horizontal surface, wherein the frame periphery is slightly smaller than the polymer sheet sample. The polymer sheet sample is then placed on the poly(ethylene terephthalate) film, and then another section of poly(ethylene terephthalate) film is placed over the polymer sheet. A second frame is then placed on top of the polymer layers. The frames are then clamped together with binder clips. The frame and polymer assembly is then placed in a preheated oven for 5 minutes at 100° C. The assembly is then removed and allowed to cool. Another $R_z$ value is then determined for the polymer sheet sample ($R_z$ 100° C.).

Permanence can then be determined according to the following formula:

$$\text{Permanence} = \left[\frac{(Rz\ 100^\circ\ \text{C.}) - (Rz\ \text{Base})}{(Rz\ \text{Final}) - (Rz\ \text{Base})}\right] \times 100$$

The clarity of a polymer sheet, and particularly a poly (vinyl butyral) sheet, can be determined by measuring the haze value, which is a quantification of light not transmitted through the sheet. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

Pummel adhesion can be measured according to the following technique, and where "pummel" is referred to herein to quantify adhesion of a polymer sheet to glass, the following technique is used to determine pummel. Two-ply glass laminate samples are prepared with standard autoclave lamination conditions. The laminates are cooled to about −17° C. (0° F.) and manually pummeled with a hammer to break the glass. All broken glass that is not adhered to the poly(vinyl butyral) sheet is then removed, and the amount of glass left adhered to the poly(vinyl butyral) sheet is visually compared with a set of standards. The standards correspond to a scale in which varying degrees of glass remain adhered to the poly(vinyl butyral) sheet. In particular, at a pummel standard of zero, no glass is left adhered to the poly(vinyl butyral) sheet. At a pummel standard of 10, 100% of the glass remains adhered to the poly(vinyl butyral) sheet. For laminated glass panels of the present invention, various embodiments have a pummel of at least 3, at least 5, at least 8, at least 9, or 10. Other embodiments have a pummel between 8 and 10, inclusive.

The "yellowness index" of a polymer sheet can be measured according to the following: Transparent molded disks of polymer sheet 1 cm thick, having smooth polymeric surfaces which are essentially plane and parallel, are formed. The index is measured according to ASTM method D 1925, "Standard Test Method for Yellowness Index of Plastics" from spectrophotometric light transmittance in the visible spectrum. Values are corrected to 1 cm thickness using measured specimen thickness. In various embodiments, yellowness index is less than 0.6, 0.5, or 0.25.

Example 1

A first multiple layer glass panel is formed with the following layers: glass//poly(vinyl butyral)//poly(ethylene terephthalate)//poly(vinyl butyral)//glass, where the poly (ethylene terephthalate) is 0.05 millimeter Dupont Mylar®, and the poly(vinyl butyral) layers are each 0.38 millimeters in thickness produced through conventional techniques.

A second multiple layer glass panel is formed with the following layers: glass//poly(vinyl butyral)//poly(ethylene terephthalate)//poly(vinyl butyral)//glass, where the poly (ethylene terephthalate) is 0.05 millimeter Dupont Mylar®, and the poly(vinyl butyral) layers are each 0.38 millimeters in thickness produced through the methods of the present invention.

Subjective analysis of the two multiple layer glass panels indicates that the first panel has visible applesauce while the second panel does not.

Example 2

A 0.76 millimeter thick poly(vinyl butyral) sheet (first sheet) is coextruded with blue pigmented color. The sheet has a WI of 13,000 and an $R_z$ of 15 microns. The sheet is embossed to a 40 micron $R_z$ and a 16,000 WI. The sheet is then laminated between two panes of glass.

A second poly(vinyl butyral) sheet is produced by conventional methods, and has a thickness of 0.76 millimeters, and an $R_z$ of 35. This second sheet is also laminated between two panes of glass.

Results indicate that mottle is visible in the second sheet but not in the first. Imaging software shows that a mottle value of 3.9 is obtained with the first sheet, while a mottle value of 14.5 is obtained with the second sheet.

By virtue of the present invention, it is now possible to provide poly(vinyl butyral) sheet, and other polymer sheet, with superior optical qualities when used in conjunction with various other polymer sheets. The problems of applesauce and mottle can be reduced or eliminated by using the methods, polymer sheets, and multiple layer constructs of the present invention.

Although embodiments of the present invention have been described in various embodiments, it will be clear to those of ordinary skill in the art that many other permutations are possible and are within the scope and spirit of the present invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a polymer sheet can be formed comprising surface topography in any of the ranges given in addition to any of the ranges given for plasticizer, to form many permutations that are within the scope of the present invention.

Any figure reference numbers given within the abstract or any claims are for illustrative purposes only and should not be construed to limit the claimed invention to any one particular embodiment shown in any figure. Figures are not drawn to scale unless otherwise noted.

Each reference, including journal articles, patents, applications, and books, referred to herein is hereby incorporated by reference in its entirety.

Table of Variables and Values for Sub SmoothData( )

| Variable | Definition | Value |
|---|---|---|
| M | Minimum space delta to count as a peak or valley (in terms of number of points) | 57.5 (changes with the number of data points in each trace) |
| L | Minimum height delta to count as a peak or valley | 5 |
| NPTPT | Total number of data points in one trace | 5760 |
| NP | Number of peaks and valleys | |
| FACT1 | To convert Perthometer data to microns | 0.038 |
| FACT3 | Factor to convert number of points to mm | 40/NPTPT |
| NTraces | Number of traces | 10 |
| PsubM | Mean Pitch | |
| PsubS | Standard deviation for pitch | |
| HsubM | Mean height | |
| HsubS | Standard deviation for height | |
| RlPm | Average mean pitch for 10 traces | |
| RlHm | Average mean height for 10 traces | |
| WvIdx | Waviness index/1000 | |

```
Sub SmoothData( )
1550 Rem Filter traces and Calculate Hm and Pm
1555 RlPm = 0 'RlPm is Roll Average Pm
1560 RlHm = 0 'RlHm is Roll Average Hm
1615 For i = 1 To NTraces
1620     E = 0
```

-continued

```
1625        For k = 1 To 150
1630           VL(k) = 0 'VL is Valley Height
1635           PK(k) = 0 'PK is Peak Height
1640           F(k) = 0 'F is Sample Point
Corresponding to Extreme
1645        Next k
1650        For j = 1 To NPTPT
'Status Bar Update (Events Log)
If j = Multiple * NPTPT / 10 Then
    Per% = 10 * (i − 1) + ((j * 10) / NPTPT)
    If Per% > 100 Then Per% = 100
    frmMainWave.sspProgressBar.FloodPercent = Per%
    Multiple = Multiple + 1
    If Multiple = 11 Then Multiple = 1
End If
1655           If j > 1 Then GoTo 1805 'If not First Point
1656           Rem Code for First Point in Each Trace Only
1660           If a(i, j) = a(i, j + 1) Then GoTo 1745
1665           If a(i, j) > a(i, j + 1) Then GoTo 1705 'First
point is a maximum
1670           Rem First Point is a Minimum
1675           Extr = 0        'Extr=0 for Minimum,
Extr=1 for Maximum
1680           E = E + 1       'Sets First Extreme
1685           VL(E) = a(i, j) 'Sets Value of 1st Valley = a(i,j)
1690           Direction = 1 'Direction (+1 is up / −1 is down)
1695           FP(i) = 0       'Sets First Point as Minimum
1700           GoTo 1735
1705           Rem First Point is a Maximum
1710           Extr = 1
1715           E = E + 1
1720           FP(i) = 1       'Sets First Point as a Maximum
1725           Direction = −1
1730           PK(E) = a(i, j)
1735           F(E) = j
1740           GoTo 2200       'Next j (Next Point)
1745           Rem First Point is the Same as the Second
Point, so Check Next
Point
1746           EQP = 1
1750           If a(i, j) = a(i, j + EQP + 1) Then Go
To 1790 'Points are still the
same
1755           If a(i, j) > a(i, j +EQP +1) Then GoTo
1775 'First Points are
Maxima
1760           Rem First Points are Minima
1765           j = j + EQP
1770           GoTo 1670     'Run Routine for Minimum First Point
1775           Rem First Points are Maxima
1780           j = j + EQP
1785           GoTo 1705     'Run Routine for Maximum First Point
1790           Rem Points are Still the Same, Check Next point
1791           EQP = EQP + 1
1795           If EQP = NPTPT − 1 Then GoTo 2570 'Next i
1800           GoTo 1750 'Check Next Point
1805           Rem This Section for Points After 1
1810           EQP = 0
1815           EP = j − 1
1820           If a(i, j) = a(i, j − 1) Then GoTo 2135 'Same Points
1825           If a(i, j) < a(i, j − 1) Then GoTo 1985 'Falling Points
1830           Rem Rising Points
1835           If Direction = 1 Then GoTo 2200
1840           Rem Local Minimum Detected at Point EP
(Extreme Point = j−1+CINT(EQP/2)
1845           If Extr = 1 Then GoTo 1895 'Last Point was a Peak
1850           Rem Last Extreme was a Valley
1855           If a(i, j) <= VL(E) Then GoTo 1870 'Current Valley was
not a Valley
                'since it Did Not Follow a Peak
                'But Followed a Local Max
1860           GoTo 1975
1870           Rem Replace Last Valley with this One
1875           VL(E) = a(i, EP)
1880           Extr = 0
1885           F(E) = EP
1890           GoTo 1975
1895           Rem Last Extreme was a Peak
1900           If Abs(a(i, EP) − PK(E)) >= I Then GoTo 1915
1905           Rem Height from Peak to this Min does
not Meat L Filtering Criteria
1910           GoTo 1975
1915           If (EP − F(E)) >= M Then GoTo 1950 'Found
a Valley − Record It
1920           Rem Number of Points from peak to t
his Min does not Meet
1925           Rem M Filtering Criteria
1930           If E = 1 Then GoTo 2200 'Next j (Next Point)
1935           If a(i, EP) >= VL(E − 1) Then GoTo 1975
1940           E = E + 1
1945           GoTo 1870
1950           Rem Found a Valley − Record It
1955           E = E + 1
1960           F(E) = EP
1965           VL(E) = a(i, EP)
1970           Extr = 0
1975           Direction = 1
1980           GoTo 2200 'Next j (Next Point)
1985           Rem Falling Points
1990           If Direction = −1 Then GoTo 2200
'Next j (Next Point)
1995           Rem Local Max Detected at Point EP
(Extreme Point = j− 1+CINT(EQP/2)
2000           If Extr = 0 Then GoTo 2045 'Last
Extreme was a Valley
2005           Rem Last Extreme was a Peak
2010           If a(i, EP) >= PK(E) Then GoTo 2020
2015           GoTo 2125
2020           Rem Replace Last Peak with This One
2025           PK(E) = a(i, EP)
2030           Extr = 1
2035           F(E) = EP
2040           GoTo 2125
2045           Rem Las Extreme was a Valley
2050           If Abs(a(i, EP) − VL(E)) >= I Then Go
To 2065 'Pass L Filtering
2055           Rem Height from Valley to this
Max does not Meet L Filtering Criteria
2060           GoTo 2125
2065           If (EP − F(E)) >= M Then GoTo 2100
'Found a Peak − Record It
2070           Rem Number of points from Valley to
this max does NOT meet
2075           Rem M Filtering Criteria
2080           If E = 1 Then GoTo 2200 'Next j (Next Point)
2085           If a(i, j) <= PK(E − 1) Then GoTo 2125
2090           E = E − 1
2095           GoTo 2020
2100           Rem Found as Peak − Record It
2105           E = E + 1
2110           F(E) = EP
2115           PK(E) = a(i, EP)
2120           Extr = 1
2125           Direction = −1
2130           GoTo 2200 'Next j (Next Point)
2135           EQP = 1
2140           If (j + EQP) < NPTPT Then GoTo 2155
2145           j = NPTPT
2150           GoTo 2200 'Next j (Next Point)
2155           EP = j − 1 + CInt(EQP / 2)
2160           If a(i, j) = a(i, j + EQP) Then GoTo 2190
2165           If a(i, j) > a(i, j + EQP) Then GoTo 2180
2170           Rem Rising Points
2175           GoTo 1830
2180           Rem Falling Points
2185           GoTo 1985
2190           EQP = EQP + 1
2195           GoTo 2140
2200        Next j 'Next Point
2205        NP = Int((E − FP(i)) / 2) 'NP = # of Points
2210        PsubM = 0      'PsubM = Pm = Mean Pitch
2215        PsubS = 0      'PsubS = Ps = Pitch Sigma (Std Dev)
2220        HsubM = 0      'HsubM = Hm = Mean Height
2225        HsubS = 0      'HsubS = Hs = Height Sigma (Std Dev)
2230        Fact3 = 12.5 / NPTPT 'Fact3 Converts Point
# Delta to 10^−3 meters
2235        For k = 1 To NP
2240           P(k) = F(2 * k + 1 + FP(i)) F(2 * k − 1 + FP(i))
```

-continued

```
2245        If P(k) > 0 Then GoTo 2260
2250        NP = NP − 1
2255        GoTo 2275
2260        PsubM = PsubM + P(k)
2265        H(k) = PK(2 * k + FP(i)) −
((VL(2 * k + 1 + FP(i)) +
VL(2 * k − 1 + FP(i))) / 2)
2270        HsubM = HsubM + H(k)
2275     Next k
2280        PsubM = PsubM / NP
2285        HsubM = HsubM / NP
2290        DelPm = 0 'DelPm is the delta (X-Xbar)
2295        DelHm = 0 'DelHm is the delta (X-Xbar)
2300        DSqPm = 0 'DSqPm is the sum of
delta squared (X-Xbar)^2
2305        DSqHm = 0 'DSqHm is the
sum of delta squared (X-Xbar)^2
2310        For k = 1 To NP
2315           DelPm = PsubM − P(k)
2320           DSqPm = DSqPm + (Del Pm ^ 2)
2325           DelHm = HsubM − H(k)
2330           DSqHm = DSqHm + (DelHm ^ 2)
2335 Next k
        'Skip over an error which might occur in
the calculation of the Std Dev
        On Error Resume Next
2340 PsubS = Sqr(DSqPm / (NP − 1))
2345 HsubS = Sqr(DSqHm / (NP − 1))
        'Disable error checking
        On Error GoTo 0
2355     Rem Convert H from Volts to Micro Meters
2359     Fact1 = 0.038 'Conversion factor for Volts to
um (Taken from S8P documentation)
2360        HsubM = (CInt(HsubM * 100 * Fact1)) / 100
'(CInt(HsubM * Fact1 *
10)) / 100 <-- (Version 1 for C5D Perthometer)
2365        HsubS = (CInt(HsubS * 100 * Fact1)) / 100
'(CInt(HsubS * Fact1 *
10)) / 100 <-- (Version 1 for C5D Perthometer)
2370     Rem Convert P from Points to Millimeters
2375        PsubM = (CInt(PsubM * Fact3 * 100)) / 100
2380        PsubS = (CInt(PsubS * Fact3 * 100)) / 100
        'SetValues for SaveData SubRoutine
        PsubMsave(i) = PsubM
        PsubSsave(i) = PsubS
        HsubMsave(i) = HsubM
        HsubSsave(i) = HsubS
        NPsave(i) = NP
2560        RIPm = RIPm + PsubM
2565        RIHm = RIHm + HsubM
2570 Next i
2575 RIPm = (CInt(RIPm * 100 / NTraces)) / 100
2580 RIHm = (CInt(RIHm * 100 / NTraces)) / 100
2585 Wvldx = RIPm * RIHm
DoEvents
End Sub
```

I claim:

1. A method of producing a multiple layer interlayer, comprising the steps of:
forming a first polymer sheet comprising poly(vinyl butyral) and a plasticizer, wherein said first polymer sheet has a first surface and a second surface and wherein said first surface has a waviness index of less than 20,000 square micrometers, an $R_z$ value of at least 20 micrometers, and a permanence of between 10 and 95;
disposing a layer of polymer film in contact with said first surface of said first polymer sheet to form a stack; and, laminating said stack.

2. The method of claim 1, wherein said waviness index is less than 15,000 square micrometers.

3. The method of claim 1, wherein said waviness index is less than 12,000 square micrometers.

4. The method of claim 1, wherein said polymer film comprises poly(ethylene terephthalate).

5. The method of claim 1, wherein said $R_z$ value is at least 30.

6. The method of claim 1, wherein said $R_z$ value is at least 35.

7. The method of claim 1, wherein said second surface has a surface with a waviness index of less than 20,000 square micrometers, an $R_z$ value of at least 20 micrometers, and a permanence of between 10 and 95.

8. The method of claim 1, further comprising the step of, prior to said laminating, adding to said stack a second polymer sheet comprising poly(vinyl butyral) and a plasticizer in contact with said polymer film opposite said first polymer sheet, wherein a surface of said second polymer sheet disposed in contact with said polymer film has a waviness index of less than 20,000 square micrometers, an $R_z$ value of at least 20, and a permanence of between 10 and 95.

9. The method of claim 8, further comprising the steps of, prior to said laminating, adding to said stack a first layer of glass in contact with said first polymer sheet opposite said layer of polymer film, and, adding to said stack a second layer of glass in contact with said second polymer sheet opposite said layer of polymer film.

10. The method of claim 1, wherein said forming a first polymer sheet comprises the steps of:
forming a smooth polymer layer comprising poly(vinyl butyral) and plasticizer, wherein said smooth polymer layer has a first surface with a waviness index of less than 15,000 square micrometers and an $R_z$ value of less than 15 micrometers, and
embossing said first surface with a roughness pattern to produce said first polymer sheet.

11. The method of claim 10, wherein said forming said smooth polymer sheet comprises using a die with a die lip temperature of from 170° C. to 230° C.

12. The method of claim 11, wherein said forming said smooth polymer sheet comprises using a mirror surface die roll.

13. A method of producing a polymer sheet, comprising:
forming a layer comprising poly(vinyl butyral) and a plasticizer, wherein said layer has a first surface and a second surface and a waviness index of less than 20,000 square micrometers and an $R_z$ value of less than 20 micrometers on said first surface, and
embossing said layer on said first surface with a roughness pattern to produce said polymer sheet, wherein said polymer sheet has a waviness index of less than 20,000 square micrometers, an $R_z$ value of at least 20 micrometers, and a permanence of between 10 and 95 on the side corresponding to said first surface of said layer.

14. The method of claim 13, wherein said waviness index of said polymer sheet is less than 15,000 square micrometers.

15. The method of claim 13, wherein said $R_z$ value of said polymer sheet is at least 35.

16. The method of claim 13, wherein said permanence of said polymer sheet is at least 50.

17. The method of claim 13, wherein said $R_z$ value of said layer is less than 5 micrometers.

18. The method of claim 13, further comprising embossing said layer on said second surface with a roughness pattern, wherein said polymer sheet has a waviness index of less than 20,000 square micrometers, and an $R_z$ value of at least 20 micrometers on the side corresponding to said second surface of said layer.

19. The method of claim 13, wherein said waviness index of said polymer sheet is less than 12,000 square micrometers.

20. The method of claim 19, wherein said $R_z$ value of said polymer sheet is at least 30.

21. A method of producing a multiple layer panel, comprising the steps of:
forming a first polymer sheet comprising poly(vinyl butyral) and a plasticizer, wherein said first polymer sheet has a first surface and a second surface and wherein said first surface has a waviness index of less than 20,000 square micrometers, an $R_z$ value of at least 20 micrometers, and a permanence of between 10 and 95;
disposing a layer of polymer film in contact with said first surface of said first polymer sheet to form a stack;
disposing a layer of glass in contact with said polymer sheet opposite said polymer film; and,
laminating said stack.

* * * * *